United States Patent
Weinzierl

(12) 
(10) Patent No.: US 6,353,766 B1
(45) Date of Patent: Mar. 5, 2002

(54) METHOD FOR GENERATING CONTROL PARAMETERS FROM A RESPONSE SIGNAL OF A CONTROLLED SYSTEM AND SYSTEM FOR ADAPTIVE SETTING OF A PID CONTROLLER

(75) Inventor: Klaus Weinzierl, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/132,083

(22) Filed: Aug. 10, 1998

Related U.S. Application Data

(63) Continuation of application No. PCT/DE97/00242, filed on Feb. 7, 1997.

(51) Int. Cl.$^7$ .............................................. G06F 13/28
(52) U.S. Cl. ............................. 700/28; 700/42; 700/48; 700/73; 710/60
(58) Field of Search ............................. 700/28, 45, 46, 700/32, 42, 48, 52, 73, 74; 710/60; 706/10, 903, 904; 703/2, 6

(56) References Cited

U.S. PATENT DOCUMENTS

| | | | |
|---|---|---|---|
| 5,182,703 A | * 1/1993 | Yamamoto | 364/148 |
| 5,379,210 A | * 1/1995 | Grujic et al. | 364/148 |
| 5,633,795 A | * 5/1997 | Popovich | 364/148 |
| 5,687,075 A | * 11/1997 | Stothers | 364/148 |
| 5,691,893 A | * 11/1997 | Stothers | 364/148 |
| 5,912,821 A | * 6/1999 | Kobayashi | 364/528.15 |

OTHER PUBLICATIONS

"Multilayer Networks" (Hertz et al.), Introduction to the Theory of Neural Computation, 1991, pp. 115–147.
International Publication No. WO 93/12476 (Mathur et al.), dated Jun. 24, 1993.
"Frequency–Weighted System Identification and Linear Quadratic Controller Design" (Hortas et al.), Journal of Guidance, Control and Dynamics, vol. 16, No. 2, 1993, pp. 330–336.

"Time and Frequency Domain System Analysis" (Meshkat), Next Generation of Control, PCIM, Aug. 1994, pp. 76–82.

"Control Technology" (Otto Föllinger), 5$^{th}$ edition, 1985, pp. 204–206.

"Control Technology" (Unbehauen), 1989, pp. 370–389.

"A Method for the Identification of System Modes" (Brandin et al.), Trans Inst MC, vol. 8, No. 5, Oct.–Dec. 1986, pp. 250–255.

"Fourier Analysis with Non–Periodic Test Signals" (R. Isermann), Identification of Dynamic Systems 1, 1989, pp. 81–113.

\* cited by examiner

Primary Examiner—David Wiley
Assistant Examiner—Firmin Backer
(74) Attorney, Agent, or Firm—Herbert L. Lerner; Laurence A. Greenberg; Werner H. Stemer

(57) ABSTRACT

Setting parameters of a PID controller are obtained by feeding a step signal or another input signal to an assigned controlled system. The response signal emitted by the controlled system is sampled and the characteristics of the Bode diagram are generated from the input signal and the response signal by using a smoothing method and elementary correspondences. The characteristics are normalized and input values are derived therefrom for a neural network which is trained on the properties of the controlled systems. The neural network directly generates the setting parameters for the controller.

68 Claims, 7 Drawing Sheets

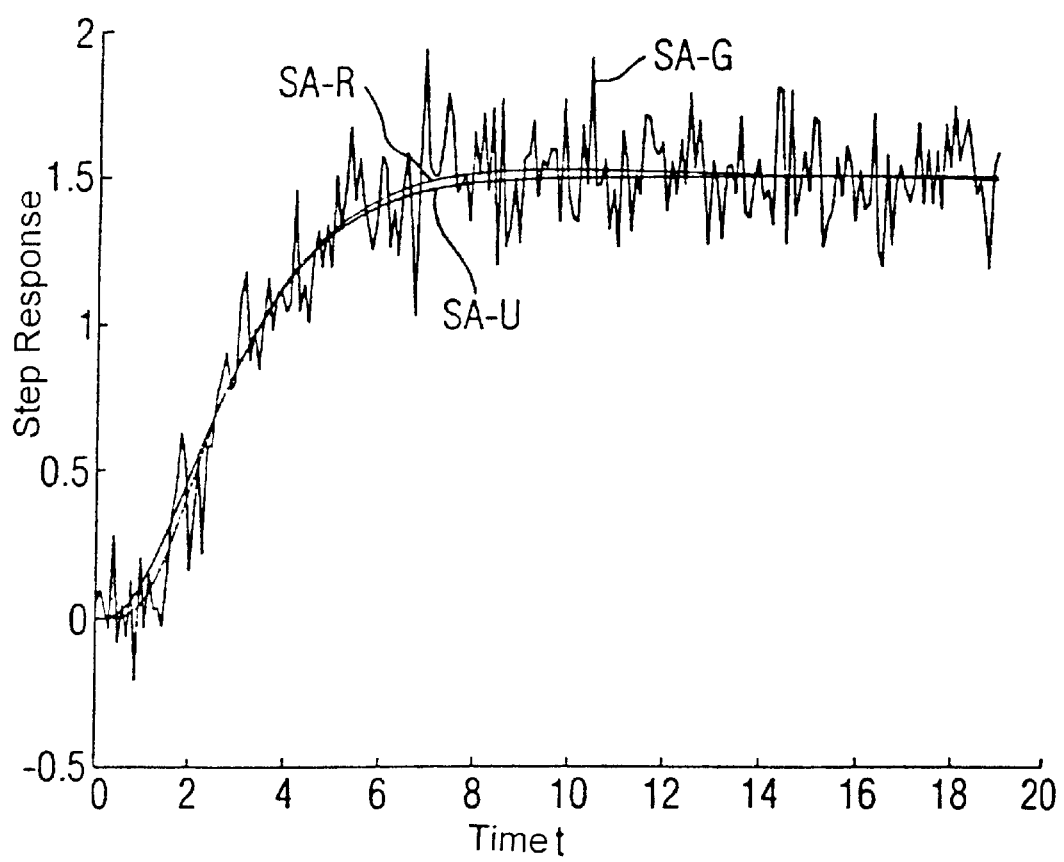

METHOD FOR GENERATING CONTROL PARAMETERS FROM A RESPONSE SIGNAL OF A CONTROLLED SYSTEM AND SYSTEM FOR ADAPTIVE SETTING OF A PID CONTROLLER

CROSS-REFERENCE TO RELATED APPLICATION

This is a continuation of copending international application PCT/DE97/00242, filed on Feb. 7, 1997, which designated the United States.

BACKGROUND OF THE INVENTION

Field of the Invention

The invention relates to a method for generating control parameters from a response signal of a controlled system with a computer. It relates, further, to a system for adaptive setting of a PID controller with the aid of a neural network.

PID controllers are known from Otto Föllinger, "Regelungstechnik" [Control Technology], $5^{th}$ Ed., Hüttig Verlag, Heidelberg 1995, pages 204–206. They are frequently used in process engineering. For this purpose, the controllers must be calculated in order to be able to control the assigned controlled system. In production engineering, there are, as a rule, no models of the controlled system available for calculating controllers. In order to set a PID controller, an identification is frequently carried out which can be performed, for example, offline on the basis of a measured step response. In this process, the appropriate model with the associated model parameters is sought from a given set of models of the controlled systems. A suitable PID controller can be calculated on the basis of this model.

It would be expedient if the identification step and the controller calculation could be combined to form a single step. A well defined mapping of the step response onto the desired controller parameters would result from this. In order to minimize the outlay arising in this case, it is obvious to approximate the same by means of a neural network. If such a trained neural network is available, suitable controller parameters can be found immediately by firstly recording the step response of the controlled system of a given technical installation and then making it available to the neural network as input. The outputs of the neural network are the controller parameters being sought.

In order to train the neural network, it is possible to prescribe controlled systems for which the associated controller parameters are directly known. It is possible to use, for example, an expert system for setting PID controllers or a library of appropriate controller parameters, which may be determined in some other way, as a basis for training the neural network. This device for training can be termed a teacher, for example. The task of the neural network is compared with that of the teacher and the network weightings are corrected so as to reduce the output error of the neural network. This is performed for a multiplicity of different prescribed system models until the error is sufficiently small for all the examples. Neural networks which satisfy these requirements are known, for example, from J. Hertz, A. Krogh, and R. Palmer, "Introduction to the Theory of Neural Computation", Addison-Wesley Pub. Co., 1991, pages 115–147. A further solution is known from international publication WO 93/12476. There, the controller parameters are determined directly from the time signals with the aid of the neural network. As a rule such networks must be very large and are difficult to train, and the emitted controller parameters are not reliable.

European patent disclosure EP 0 520 233 A2 discloses a device for indicating the parameters of a transmission system, in which a simulation module is used to compare estimated output signals with measured output signals. Deviations are minimized for optimum parameters.

Instead of the step response of the controlled system, the following text refers to the response signal of the controlled system.

SUMMARY OF THE INVENTION

It is accordingly an object of the invention to provide a method for generating control parameters from a response signal of a controlled system and a system for an adaptive setting of a PID controller with the aid of a neural network which overcomes the above-mentioned disadvantages of the heretofore-known methods and systems of this general type and according to which, characteristics of a Bode diagram are generated from a noisy response signal, wherein the characteristics are largely uninfluenced by the noise. A further object is to specify a system for adaptively setting a PID controller with the aid of a neural network, in which the controller parameters emitted by the neural network ensure an acceptable controller setting even in the presence of a noisy response signal.

With the foregoing and other objects in view there is provided, in accordance with the invention, a method for generating control parameters from a response signal of a controlled system with a computer, the method which comprises:

sampling an input signal and a response signal for generating a sampled input signal and a sampled response signal;

smoothing and optionally differentiating the sampled input signal and the sampled response signal with the aid of a time-variant filter for generating a smoothed input signal and a smoothed response signal;

generating in each case frequency characteristics from the smoothed input signal and the smoothed response signal;

forming a difference between the frequency characteristics in a Bode diagram; and determining control parameters with the aid of the difference.

With the foregoing and other objects in view there is also provided, in accordance with the invention, a method for generating control parameters from a response signal of a controlled system with a computer, the method which comprises:

sampling an input signal and a response signal for generating a sampled input signal and a sampled response signal;

deconvoluting the response signal with respect to the input signal for generating a smoothed impulse response from the sampled response signal;

forming frequency characteristics in a Bode diagram from the impulse response; and determining control parameters with the aid of the frequency characteristics.

With the foregoing and other objects in view there is furthermore provided, in accordance with the invention, a method for generating control parameters from a response signal of a controlled system with a computer, the method which comprises:

sampling a response signal for generating a sampled response signal;

smoothing or smoothing and differentiating the sampled response signal with the aid of a time-variant filter for generating a smoothed response signal;

generating frequency characteristics in a Bode diagram from the smoothed response signal;

determining control parameters with the aid of the frequency characteristics.

In preferred embodiments of the methods according to the invention any of the steps of deconvoluting, smoothing or smoothing and differentiating of either the input signal or the response signal or the step of generating the impulse response may be performed in accordance with the formula:

$$\tilde{x} = \underline{V}x$$

$$\underline{v} = \underline{V}y$$

where $\underline{y}$ is a vector consisting of samples of the response signal, $\underline{V}$ is a matrix for at least one of deconvoluting, smoothing or smoothing and differentiating, $\underline{v}$ is a vector of a smoothed impulse response, $\underline{x}$ is a vector of the input signal, and $\tilde{x}$ is a vector of the smoothed input signal.

In accordance with a further feature of the invention, the matrices $\underline{V}$ for smoothing, for smoothing and differentiating or for deconvoluting are obtained from an energy function having a term specifying a deviation of an approximation from a measured response signal, and having a term specifying a roughness of a reconstructed impulse response.

In accordance with a another feature of the invention, a smoothing deconvolution matrix $\underline{V}$ is obtained by minimizing the following energy function:

$$\epsilon(\underline{b}) = k((\underline{y} - \underline{X}\underline{A}^3\underline{b})^T \underline{D}_0 (\underline{y} - \underline{X}\underline{A}^3\underline{b}) + \underline{v}^T$$

$$\underline{D}_1\underline{v} + \underline{a}^T \underline{D}_2\underline{a} + \underline{r}^T\underline{D}_3\underline{r} + \underline{b}^T\underline{D}_4\underline{b})$$

where k denotes a constant, e.g. k=0.5, $\underline{X}$ a convolution integration matrix which is calculated as a function of the input signal x(t), $\underline{A}$ an integration matrix, $\underline{r} = \underline{A}\,\underline{b}$, $\underline{a} = \underline{A}\,\underline{r}$, $\underline{v} = \underline{A}\,\underline{a}$, and $\underline{D}_0, \underline{D}_1\underline{D}_2, \ldots \underline{D}_4$ arbitrarily selectable diagonal matrices, and the solution of a minimization is $$\underline{v} = \underline{V}y$$

$$\underline{V} = \underline{A}^3(\underline{A}^{3T}\underline{X}^T\underline{D}_0\underline{X}\underline{A}^3 + \underline{A}^{3T}\underline{D}_1\underline{A}^3 + \underline{A}^{2T}\underline{D}_2\underline{A}^2 +$$

$$\underline{A}^T\underline{D}_3\underline{A} + \underline{D}_4)^{-1}\underline{A}^{3T}\underline{X}^T\underline{D}_0.$$

In accordance with a further feature of the invention, the matrix $\underline{V}$ for smoothing or smoothing and differentiating is:

$$\underline{V} + \underline{A}^3(\underline{A}^{4T}\underline{D}_0\underline{A}^4 + \underline{A}^{3T}\underline{D}_1\underline{A}^3 + \underline{A}^{2T}\underline{D}_2\underline{A}^2 + \underline{A}^T\underline{D}_3\underline{A} + \underline{D}_4)^{-1}\underline{A}^{4T}\underline{D}_0$$

where $\underline{D}_1 \ldots \underline{D}_4$ denote arbitrarily selectable diagonal matrices, $\underline{A}$ an integration matrix, and T a transposition.

In accordance with a further feature of the invention, the matrix for smoothing or smoothing and differentiating is obtained from the energy function $$\epsilon(\underline{a}) = k[(\underline{y} - \underline{A}^2\underline{a})^T(\underline{y} - \underline{A}^2\underline{a}) + \underline{a}^T\underline{D}\underline{a}]$$

the first term being the deviation of the approximation from the measured response signal, the second term being the roughness of the approximation, with $\underline{s} = \underline{A}v$, $\underline{v} = \underline{A}a$, and $\underline{s} = \underline{A}^2\underline{a}$, $\underline{D}$ being a diagonal matrix, A an integration matrix, k being a constant, e.g. k=0.5, $\underline{y}$ a vector consisting of samples of the response signal, and T indicating a transposition.

In accordance with a further feature of the invention, the matrix for smoothing or the matrix for smoothing and differentiating is obtained from the energy function $$\epsilon(\underline{b}) = k[(\underline{y} - \underline{A}^4\underline{b})^T\underline{D}_0(\underline{y} - \underline{A}^4\underline{b}) + \underline{v}^T\underline{D}_1$$

$$\underline{v} + \underline{a}^T\underline{D}_2\underline{a} + \underline{r}^T\underline{D}_3\underline{r} + \underline{b}^T\underline{D}_4\underline{b}]$$

where $\underline{D}_1 \ldots \underline{D}_4$ are diagonal matrices, $\underline{A}$ is an integration matrix, $\underline{s} = \underline{A}\,\underline{v}$, $\underline{v} = \underline{A}\,a$, $\underline{a} = \underline{A}\,\underline{r}$, $\underline{r} = \underline{A}\,\underline{b}$, k is a constant, $\underline{y}$ a vector consisting of samples of the response signal, and T indicates a transposition.

In accordance with a further feature of the invention, the Bode diagram is normalized with respect to frequency and preferably normalized to a frequency at which a phase characteristic assumes a value $-\phi_N$.

In accordance with a further feature of the invention, characteristics of the Bode diagram are generated in accordance with a method of approximating a step response or an impulse response by a polygon or by rectangular blocks and the transformation into the frequency domain is performed with elementary correspondences.

In accordance with a further feature of the invention, a frequency response is approximated with the aid of the relation:

$$H(j\omega) \cong \sum_{\nu=1}^{q} h[\nu-1]H_\nu(j\omega) \cong \frac{1}{(q-1)T}\sum_{\nu=1}^{q} v_\nu H_\nu(j\omega)$$

where $H(j\omega)$ denotes a frequency response, and h and T symbolize a height and a width of a rectangular block, respectively.

In accordance with a further feature of the invention, an approximation of the frequency response is obtained from the vector $\underline{y}$ with:

$$\underline{f} \cong \frac{1}{(q-1)T}H\underline{V}\underline{y}$$

with $$\underline{H} = [\underline{h}_1 \underline{h}_2 \ldots \underline{h}_m]^T,$$

and $$[H(j\omega_1) H(j\omega_2) \ldots H(j\omega_m)] \cong \frac{1}{(q-1)T}\underline{v}^T[h_1 h_2 \ldots h_m],$$

where $\underline{f}$ denotes an approximation of the frequency response, $\underline{H}$ a frequency transformation matrix, $\underline{V}$ a matrix for smoothing, for smoothing and differentiating or for deconvoluting, and $\underline{y}$ a vector consisting of samples of the response signal.

With the foregoing and other objects in view there is also provided, in accordance with the invention, a system for adaptive setting of a PID controller with the aid of a neural network, comprising:

a sampling device for sampling a response signal, the response signal emitted by a controlled system in response to a supplied input signal;

a transformation device for smoothing and optionally differentiating the input signal and the response signal and transforming the input signal and the response signal into a frequency domain;

a diagram device for forming a difference between frequency characteristics of the input signal and the response signal in a Bode diagram and for generating a Bode diagram of the controlled system; and a neural network for emitting parameters for setting a PID controller, an absolute value characteristic of the Bode diagram and a phase characteristic of the Bode diagram being supplied to the neural network as input values either directly or after a conversion.

With the foregoing and other objects in view there is furthermore provided, in accordance with the invention, a system for adaptive setting of a PID controller with the aid of a neural network, comprising:

a sampling device for sampling a response signal, the response signal emitted by a controlled system in response to a supplied input signal;

a deconvolution device for calculating a smoothed impulse response from the response signal as a function of the input signal;

a diagram device for obtaining a Bode diagram of the controlled system from the smoothed impulse response;

a neural network for emitting parameters for setting a PID controller, an absolute value characteristic of the Bode diagram and a phase characteristic of the Bode diagram being supplied to the neural network as input values either directly or after a conversion thereof.

With the foregoing and other objects in view there is also provided, in accordance with the invention, a system for adaptive setting of a PID controller with the aid of a neural network, comprising:

a sampling device for sampling a response signal, the response signal emitted by a controlled system in response to a supplied input signal;

a transformation device for smoothing and optionally differentiating the response signal and transforming the response signal into a frequency domain;

a diagram device for generating a Bode diagram from the smoothed response signal;

a neural network for emitting parameters for setting a PID controller, an absolute value characteristic of the Bode diagram and a phase characteristic of the Bode diagram being supplied to the neural network as input values either directly or after a conversion.

In accordance with a further feature of the invention, a normalization device for normalizing the Bode diagram with respect to the frequency is provided.

Preferred embodiments of the systems for the adaptive setting of a PID controller operate by using the methods for generating control parameters in accordance with the invention.

According to the invention, the controller parameters are not determined by the neural network directly from the step response, but the frequency characteristics of the system are calculated in advance from the step response. The neural network is then fed input values which are calculated from the frequency characteristics of the system. As an advantage, it is possible to use much smaller networks which emit good controller parameters with greater reliability. Methods for calculating the frequency characteristics of the system from an emitted step response are known, for example, from H. Unbehauen, "Regelungstechnik" [Control Technology], 1989, pages 370–389 and from R. Isermann, "Identifikation dynamischer Systeme 1" [Identification of Dynamic Systems], Springer Verlag, 1989, pages 81–113. However, these become problematic when noise signals are superimposed on the step response. When such a noisy step response is used to calculate the frequency characteristics which drive the neural network, it is still possible that the controller parameters generated by the neural network are unsuitable. The measures described by Unbehauen and Isemann for smoothing the step response either require several measurements or are not sufficient to achieve the desired reliability. For this reason, the invention also describes a novel smoothing method which permits the frequency characteristics of the system to be calculated from a single noisy measurement.

Consequently, the neural network does not receive as input variables features formed directly from the step response, but the step response is preprocessed. This preprocessing comprises smoothing and differentiating the step response, followed by a Fourier transformation, which can be combined to form a matrix multiplication with a complex-value matrix. The data thus obtained are plotted in the form of a Bode diagram. Subsequently, the frequency characteristics found are normalized, that is to say the absolute-value characteristic with respect to the amplitude and the frequency, and the phase characteristic with respect to the frequency. In the Bode diagram, this normalization effects a simple displacement of the frequency characteristics. The normalization quantity is that frequency at which the phase characteristic assumes the value $-100°$, and the associated absolute value of the absolute-value characteristic. The neural network must therefore learn only normalized control parameters for normalized systems, which results in a simplification. Characteristic quantities are now formed as input variables for the neural network from the remaining normalized frequency characteristics. The output variables of the network represent the normalized controller parameters of the PID controller. Finally, the desired controller parameters are obtained by denormalization.

Several methods are known for obtaining frequency responses from a step response of a linear controlled system. Reference is made to the methods of the Fast Fourier Transform (FFT) or the Discrete Fourier Transform (DFT). A further practicable method is approximation of the step response by means of a polygon and transformation into the frequency domain by means of elementary correspondences, as is described by H. Unbehauen and R. Isermann for example. The direct application of these methods in the case of a noisy step response is, however, not sufficient as a rule for determining the control parameters. In this case, it is generally recommended to perform a time-consuming excitation of the controlled system by means of multiple steps or impulses or by means of stochastic signals, which is seldom possible in process engineering.

In order to obtain sufficiently indicative frequency characteristics in the Bode diagram for designing a PID controller with the aid of a single, even noisy step response, according to the invention the step response is firstly smoothed, use being made for the purpose of smoothing of the fact that the step response is available over the entire variation for the purpose of determining a point on the smoothed curve. After the smoothing, the step response can be differentiated, the result being an estimate of the system impulse response. The estimated impulse response now represents the basis for determining the frequency characteristics of the controlled system in a fashion analogous to the methods presented by Unbehauen and Isermann. This method still yields good results even given a very noisy step response. The two named operations can be formulated in matrix notation and combined to form a single matrix multiplication with a complex-value matrix.

The method has been described so far with the use of a step response. However, this is not necessary, since the method also operates satisfactorily when an arbitrary response signal of a controlled system is used.

In this case, there are two possibilities for generating the frequency characteristics in the case of a closed control loop. With the first possibility, the input signal and the response signal can be used. With both, the step response is firstly smoothed and then subjected to Fourier transformation, as before. Differentiation can be dispensed with here, having no influence on the result. The result is now two frequency characteristics, one for the input signal and one for the response signal. The difference between the two frequency characteristics in the Bode diagram yields the desired frequency response of the system. This possibility is likewise described by Unbehauen and Isermann.

With the second possibility, the smoothed impulse response of the system is calculated by deconvoluting the response signal with respect to the input signal. This deconvolution operation depends on the input signal. If the input signal is stepped, the deconvolution operation is identical to a smoothing and subsequent differentiation. The second method thus represents a generalization of the smoothing method as a smoothing deconvolution.

Other features which are considered as characteristic for the invention are set forth in the appended claims.

Although the invention is illustrated and described herein as embodied in a method for generating control parameters from a response signal of a controlled system with a computer and as a system for an adaptive setting of a PID controller with the aid of a neural network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a graph of a noisy step response.

In the further description the step response, which is emitted by the controlled system in the case of the presence of a step signal, is used.

DESCRIPTION OF THE PREFERRED EMBODIMENTS

Figure 1:
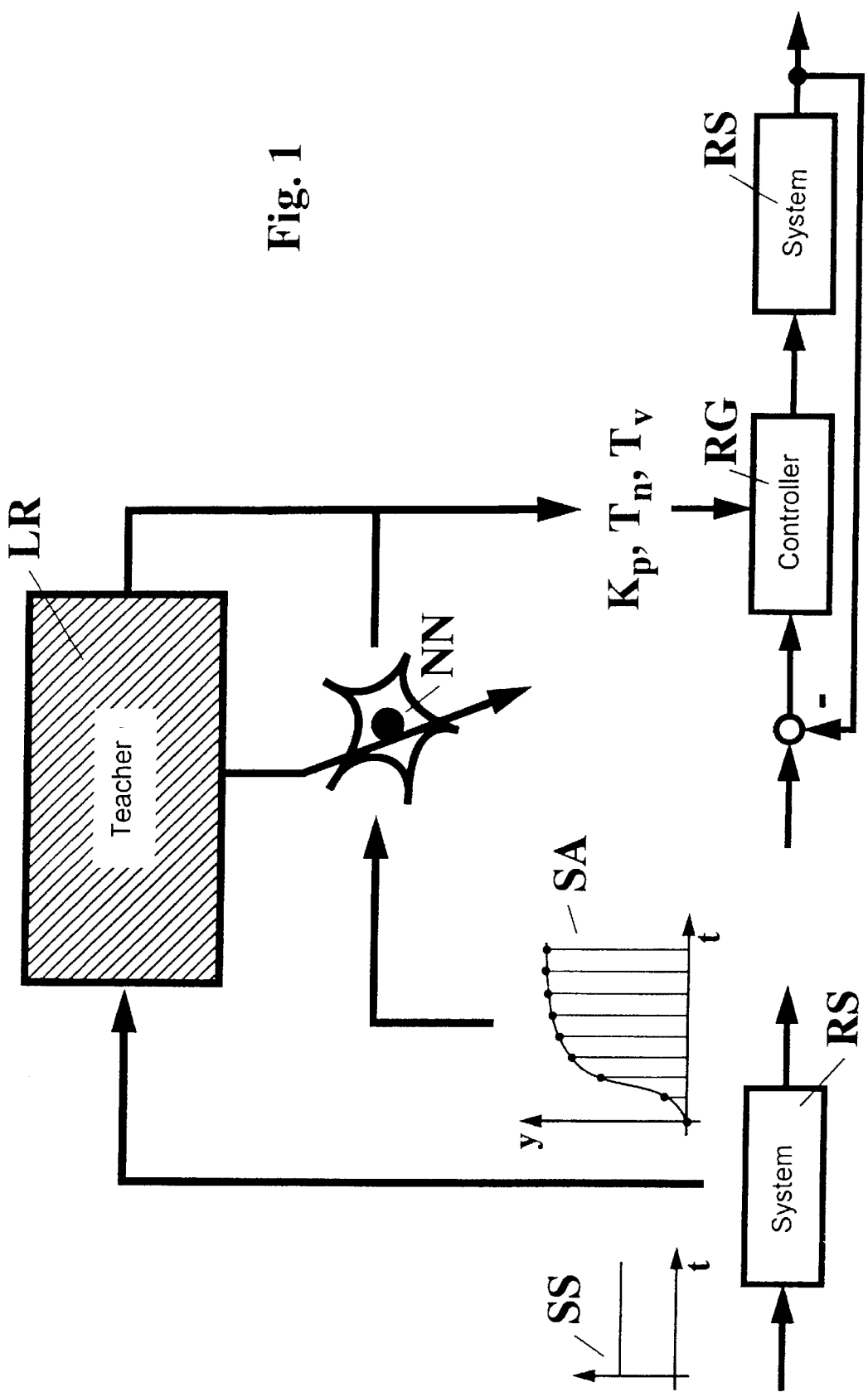
FIG. 1 is a schematic a block diagram of the system.

Referring now to the figures of the drawings in detail and first, particularly, to FIG. 1, there is seen the design of a control loop comprising a controlled system RS and a controller RG. The controller RG may indicate a PID controller. The controlled system RS is represented once more symbolically, and here the invention provides that a step signal SS be fed, the controlled system generating on the basis of the step signal a step response SA, whose amplitude y is represented plotted against time t. Before a neural network NN can generate parameters Kp, Tn, Tv for setting the controller RG, it must firstly be trained. Here, Tn is the integral-action time, Tv the derivative-action time and Kp the proportionality factor (see also Otto Föllinger, Regelungstechnik, 5. Auflage, Hüttingverlag, Heidelberg 1995, pages 204–206).

The neural network NN is trained with the aid of a teacher LR which, in accordance with one of the methods specified above, sets the weightings of the neural network such that the values emitted by the teacher LR and the neural network on the basis of a step response are approximately identical. For this purpose, the neural network NN must be fed the step response SA for a large number of different systems. The teacher LR is generally fed the system parameters directly. However, other variables can also be processed for the purpose of uniquely characterizing the system. As long as the values of the neural network NN deviate from those of the teacher, the teacher adjusts the weightings of the neural network NN until no further reduction in the deviation is possible. The training of the neural network NN is not the subject matter of the present invention; it can be performed in a known way.

Figure 2:
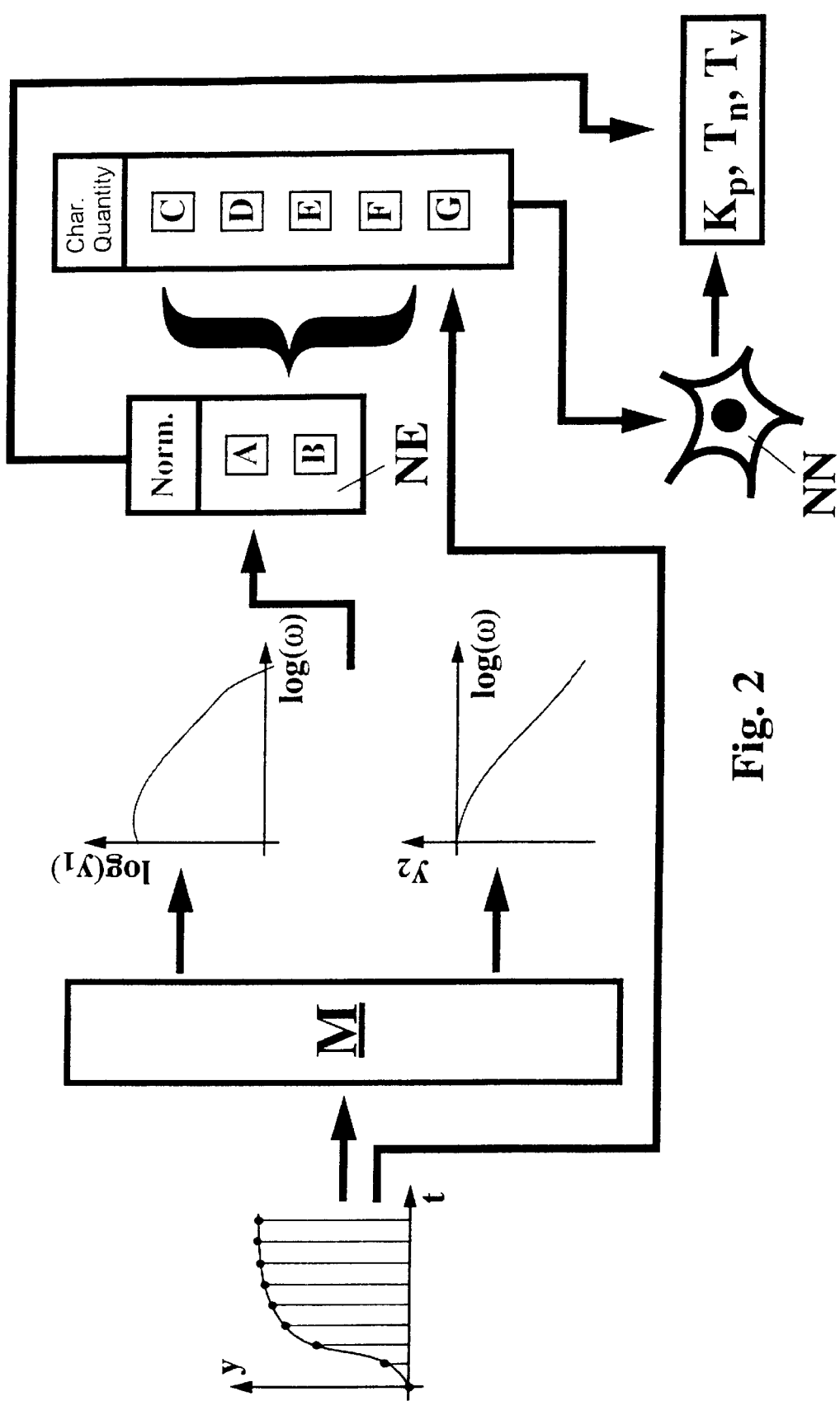
FIG. 2 is a schematic of a detailed part of the system.

A detailed representation of the system follows from FIG. 2. The step response SA is sampled at different times, the sampling times $T_1, T_2 \ldots T_q$, and the amplitude values y present at these instants are fed to a means for smoothing and Fourier transformation M. In one step, the latter carries out the inventive smoothing of the step response SA and, using the methods specified by H. Unbehauen and R. Isermann, generates the amplitude characteristic y1 and the phase characteristic y2 from the smoothed step response. The two characteristics of the Bode diagram are represented in FIG. 2 as a function of the frequency ω. The two characteristics are normalized in a normalization unit NE, and characteristic quantities, for example C, D, E, F, which are fed to the neural network NN as input variables, are formed from the normalized characteristics. The characteristic quantity G is calculated directly from the step response and likewise fed to the neural network NN. The neural network NN generates the controller parameters Kp, Tn, Tv on the basis of these input variables. These controller parameters Kp, Tn, Tv are used to set the PID controller in such a way that the control loop operates satisfactorily.

It will firstly be explained below how a smoothed step response is generated from the noisy step response SA. Use is made in this process of the fact that in the normal case the step response of a given controlled system changes relatively sluggishly in time. Rapid changes are to be ascribed with high probability to noise signals. To simplify the representation of the invention, the measured step response y(t) is assumed to have q equidistant interpolation points, that is to say $$y[n]=y(nT), n=0,1,\ldots, q-1$$

Here, T is the sampling time. The time-discrete signal y(n) can now be combined to form a vector $$\underline{y} = \begin{bmatrix} y[0] \\ y[1] \\ \vdots \\ y[q-1] \end{bmatrix} \quad (1)$$

Furthermore, the (q×q) summation matrix is introduced, $$A := \frac{200}{q-1} \begin{bmatrix} 1 & 0 & \cdots & 0 \\ 1 & 1 & \cdots & 0 \\ \vdots & \vdots & \cdots & \vdots \\ 1 & 1 & \cdots & 1 \end{bmatrix} \qquad (2)$$

by means of which it is possible, for example, to express by $\underline{A}\underline{v}$ an accumulating summation of the components of $\underline{v}$. This represents one of many possible approximations of the integration operator $$A\{y\} := \frac{200}{(q-1)T} \begin{bmatrix} \int_0^0 y(T)\,dT \\ \int_0^T y(T)\,dT \\ \vdots \\ \int_0^{(q-1)T} y(T)\,dT \end{bmatrix} \qquad (2a)$$

The aim is to find a smoothed vector $\underline{s}$ as approximation for the vector $\underline{y}$. Use is made for this purpose of the smoothing effect of the accumulating summation, that is to say the vector $\underline{s}$ is firstly expressed by $$\underline{s} = \underline{A}\,\underline{v} \qquad (3)$$

$$\underline{v} = \underline{A}\,\underline{a} \qquad (4)$$

The condition $\underline{s}=\underline{y}$ would then signify $\underline{A}^2\underline{a}=\underline{y}$, something which causes the roughness in $\underline{y}$ to appear amplified for $\underline{a}$. An attempt is then made to set up approximately the equality between $\underline{s}$ and $\underline{y}$, the aim then being, for example, for $\|\underline{a}\|$ or, with a suitably prescribed diagonal matrix $\underline{D}$ with positive entries, for the expression $\underline{a}^T\underline{D}\underline{a}$ to be as small as possible. This constitutes the basic idea of the smoothing method. The energy function $$\epsilon(\underline{a}) = k[(\underline{y}-\underline{A}^2\underline{a})^T(\underline{y}-\underline{A}^2\underline{a}) + \underline{a}^T\underline{D}\underline{a}] \qquad (5)$$

k=constant, for example k=0.5
is formed and minimized to obtain a solution. Here, the first term evaluates the deviation of the approximation from the measured step response, and the second term evaluates the roughness of the approximation. The solution $$\underline{a} = [\underline{A}^{2T}\underline{A}^2 + \underline{D}]^{-1}\underline{A}^{2T}\underline{y} \qquad (6)$$

is calculated by equating the gradient of $\epsilon(\underline{a})$ to zero, and from this the vector $\underline{s}$ for the smoothed step response is calculated in accordance with equations (3) and (4). In the limiting case of $\underline{D}=0$, this gives $\underline{s}=\underline{y}$, that is to say the smoothing effect disappears.

The noise suppression can be further improved by including yet further terms of the same type in equations (3) and (4) and supplementing the energy function equation (5) in this regard. The following energy function $$\epsilon(\underline{b}) = k[(\underline{y}-\underline{A}^4\underline{b})^T\underline{D}_0(\underline{y}-\underline{A}^4\underline{b}) + \underline{v}^T$$

$$\underline{D}_1\underline{v} + \underline{a}^T\underline{D}_2\underline{a} + \underline{r}^T\underline{D}_3\underline{r} + \underline{b}^T\underline{D}_4\underline{b}] \qquad (7)$$

is advantageous and which has suitably selected diagonal matrices $\underline{D}_0$, $\underline{D}_1$, $\underline{D}_2$, $\underline{D}_3$ and $\underline{D}_4$ with positive entries, the following equations (8) and (9)

$$\underline{a} = \underline{A}\,\underline{r} \qquad (8)$$

$$\underline{r} = \underline{A}\,\underline{b} \qquad (9)$$

being added to equations (3) and (4). The matrix $\underline{D}_1$ is set as a rule in this case to 0.

The importance of the novel smoothing method for the subsequent further processing resides, above all, in the possibility of also directly specifying from the noisy step response y(t) via the vector $\underline{v}$ a good, satisfactorily smooth estimate for the impulse response h(t)=ds(t)/dt using $$h(nT) = h[n] \cong v_{n+1}/T(q-1) \qquad (10)$$

$v_{n+1}$ denoting the (n+1)th component of $\underline{v}$ and s(t) the exact step response SA-U without noise. These relationships follow from FIG. 5, which shows the noisy step response SA-G, the noiseless step response SA-U and the smoothed step response SA-R. The reconstruction of the impulse response can be performed using $$\underline{v} = \underline{V}\underline{y} \qquad (11)$$

by means of a simple matrix multiplication of the vector $\underline{y}$ by a fixed matrix, $\underline{V}$ being determined in the way described by minimizing the energy function equation (7), substituting it in equations (9), (8) and (4), resolving it for $\underline{v}$ and extracting $\underline{y}$ from the brackets. The result for $\underline{V}$ is $$\underline{V} = \underline{A}^3[\underline{A}^{4T}\underline{D}_0\underline{A}^4 + \underline{A}^{3T}\underline{D}_1\underline{A}^3 + \underline{A}^{2T}\underline{D}_2\underline{A}^2 + \underline{A}^T\underline{D}_3\underline{A} + \underline{D}_4]^{-1}\underline{A}^{4T}\underline{D}_0 \qquad (12)$$

The method described can now be supplemented for the case when the input signal is not stepped. The convolution operator $$X\{v\} := \frac{200}{(q-1)T} \begin{bmatrix} \int_0^0 x(t-\tau)v(\tau)\,d\tau \\ \int_0^T x(t-\tau)v(\tau)\,d\tau \\ \vdots \\ \int_0^{(q-1)T} y(t-\tau)v(\tau)\,d\tau \end{bmatrix} \qquad (12a)$$

is introduced for this purpose. By contrast with A{v}, X{v} denotes a convolution integration operator of v(t) with the input signal x(t). Just as in the case of A{ }, it is possible from this to form a convolution matrix $\underline{X}$ by approximating the integration with a sum.

The smoothed impulse response is now determined not by minimizing the energy function equation (7), but by minimizing the extended energy function $$\epsilon(\underline{b}) = k((\underline{y}-\underline{X}\underline{A}^3\underline{b})^T\underline{D}_0(\underline{y}-\underline{X}\underline{A}^3$$

$$\underline{b}) + \underline{v}^T\underline{D}_1\underline{v} + \underline{a}^T\underline{D}_2\underline{a} + \underline{r}^T$$

$$\underline{D}_3\underline{r} + \underline{b}^T\underline{D}_4\underline{b}) \qquad (12b)$$

The solution is now obtained as $$\underline{v} = \underline{W}\underline{y} \qquad (12c)$$

where $$\underline{V} = \underline{A}^3(\underline{A}^{3T}\underline{X}^T\underline{D}_0\underline{X}\underline{A}^3 + \underline{A}^{3T}\underline{D}_1$$

$$\underline{A}^3 + \underline{A}^{2T}\underline{D}_2\underline{A}^2 + \underline{A}^T\underline{D}_3\underline{A} + \underline{D}_4)^{-1}\underline{A}^{3T}\underline{X}^T\underline{D}_0 \qquad (12e)$$

The vector characterizing the impulse response can thus be determined, as in the case of the stepped excitation by customary matrix multiplication, from the vector y of the measured output signal. The matrix $\underline{V}$ is, however, now a function of the input signal x(t), because the matrix $\underline{X}$ depends on the input signal.

The calculation of the Bode diagram from the smoothed impulse response is performed analogously in accordance with the methods presented by H. Unbehauen and R. Isermann on the basis of a polygon for the step response. This is advantageous because the frequency points are often to lie equidistantly on the logarithmic scale. However, in the case of the method employed only a single impulse response is used, although after preliminary smoothing and differentiation of the step response emitted by the controlled system. This is necessary in process engineering, since a step response, for example in the case of chemical plants, frequently requires several hours, and for reasons of safety it is generally desirable to deviate the system as little as possible from the operating point, that is to say it is impossible in many instances to have a sequence of several steps or a high-frequency excitation.

The calculation of the system frequency response is explained in more detail below. The desired frequency response H(jω), 0<ω<∞ is obtained by Laplace transformation of the impulse response h(t)=ds(t)/dt of the system, the generally complex-valued Laplace variable s being set equal to jω. As an approximation, the impulse response h(t) can be approximated by a stair-step function, the v-th rectangular block (v=1,2, ..., q−1) in each case having the width T and the height h(v−1)=h((v−1)T)≅$v_v$/T. Only the last, qth block of height h[q−1] embraces the time interval ((q−1)T,∞). This corresponds in the result to the method represented in by H. Unbehauen and R. Isermann. An approximation by means of a polygon connection or by splines is also possible for the purpose of increasing the accuracy.

The frequency responses of the individual rectangular blocks can be specified directly by means of elementary correspondences (see e.g. the publications of H. Unbehauen and R. Isermann). If $H_v(j\omega)$ denotes the frequency response of the vth rectangular block normalized to height 1, the sum $$H(j\omega) \cong \sum_{v=1}^{q} h[v-1]H_v(j\omega) \cong \frac{1}{(q-1)T}\sum_{v=1}^{q} v_v H_v(j\omega) \quad (13)$$

is obtained as the approximation of the desired frequency response H(jω).

An essential fact concerning the above consideration is that in the case of a fixed frequency $\omega=\omega_\mu$ in the above sum, the contributions $H_v(j\omega)$ of each individual block normalized to height 1 are characterized in each case by one fixed complex number. If these complex numbers are combined to form a vector, that is to say $$\underline{h}_\mu = \begin{bmatrix} H_1(j\omega_\mu) \\ H_2(j\omega_\mu) \\ \vdots \\ H_q(j\omega_\mu) \end{bmatrix} \quad (14)$$

the result is $$H(j\omega) \cong \frac{1}{(q-1)T}\underline{v}^T\underline{h}_\mu \quad (15)$$

or, in the case of several, arbitrary frequency points $\omega_1$, $\omega_2 \ldots \omega_m$, correspondingly, $$[H(j\omega_1)H(j\omega_2) \ldots H(j\omega_m)] \cong \frac{1}{(q-1)T}\underline{v}^T[\underline{h}_1\underline{h}_2\ldots\underline{h}_m] \quad (16)$$

This means that calculation of the frequency response can be approximated by the matrix multiplication of the vector $\underline{v}$ of the impulse response and a fixed matrix.

It is assumed in this case that the starting point is not the sample values of the measured step response, but the already smoothed vector $\underline{v}$ of the impulse response. Since it is also the case with the smoothing algorithm that the vector $\underline{v}$ is yielded from the vector $\underline{y}$ of the measured sample values by multiplication with a fixed matrix, the two matrix multiplications can be combined so that no additional effort results from the smoothing.

Using summary notation with the abbreviations $$\underline{f} = \begin{bmatrix} H(j\omega_1) \\ H(j\omega_2) \\ \vdots \\ H(j\omega_m) \end{bmatrix} \quad (17)$$

the frequency transformation matrix $$\underline{H} := [\underline{h}_1\underline{h}_2\ldots\underline{h}_m]^T \quad (18)$$

and the smoothing matrix $\underline{V}$ as solution matrix of the previously described smoothing method, the solution $$\underline{f} \cong \frac{1}{(q-1)T}HV\underline{y} \quad (19)$$

is therefore obtained immediately as the approximation of the system frequency response from the vector $\underline{y}$ of the measured sample values of the system step response.

Figure 6:
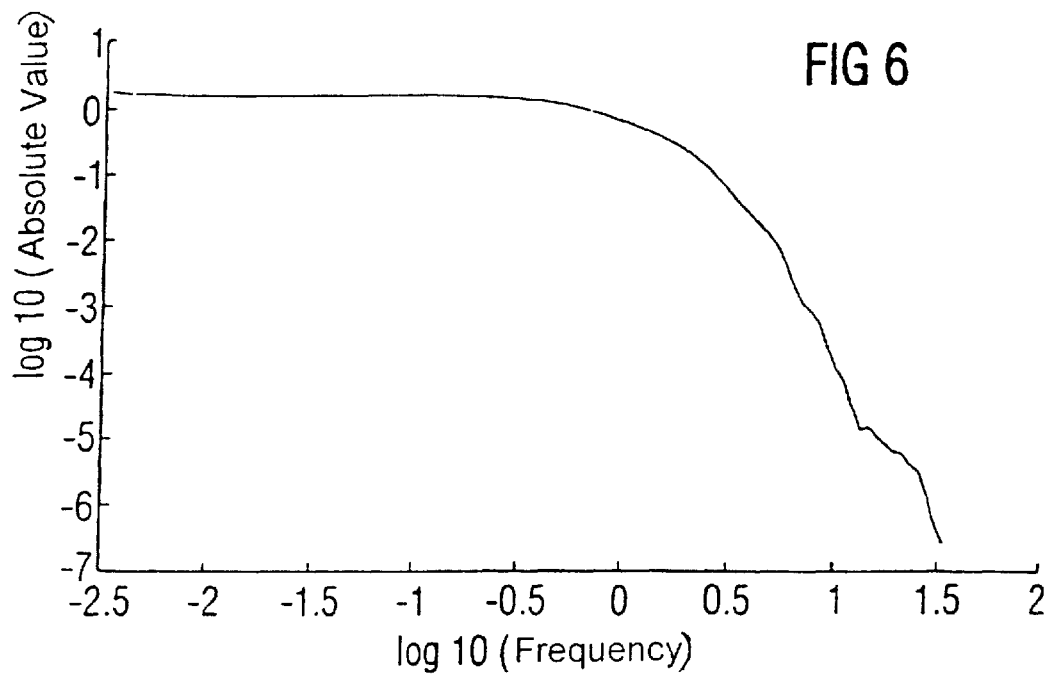
FIG. 6 is a graph of the course of the absolute-value characteristic.
Figure 7:
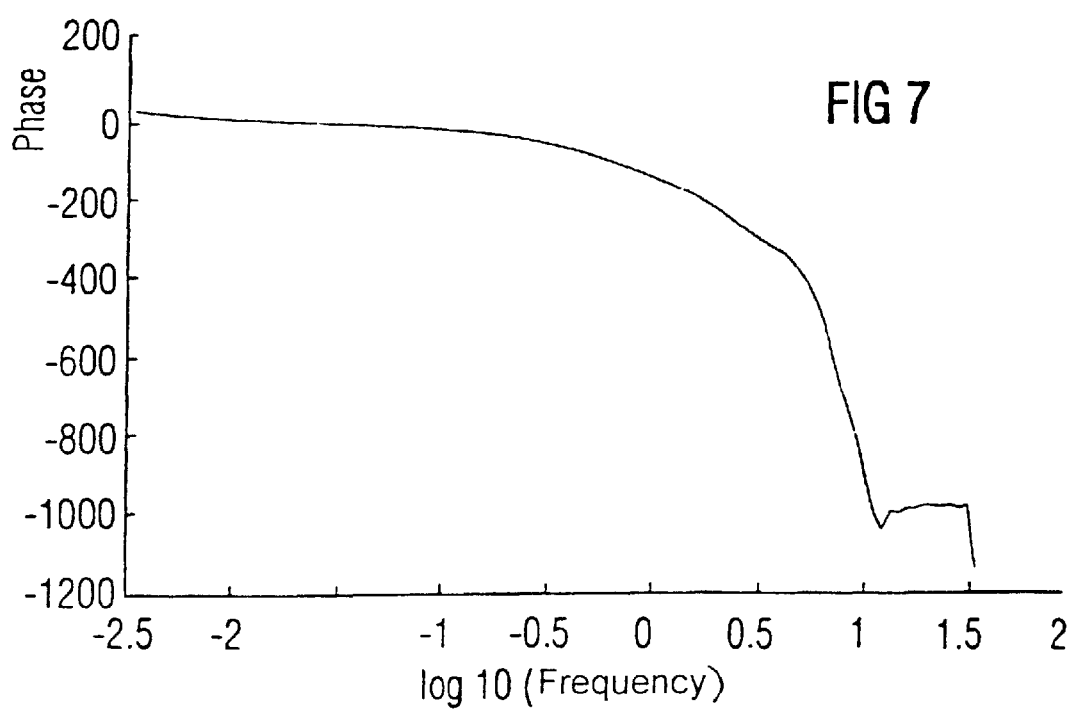
FIG. 7 is a graph of the course of the phase characteristic.

As already set forth in the introduction, the frequency characteristics shown in FIGS. 6, 7 can therefore be obtained directly by matrix multiplications of the vector $\underline{y}$ by a fixed matrix calculated once in advance.

The normalized values can be obtained in the following way from these frequency characteristics (see FIG. 6, FIG. 7):

Let x=log 10(ωT) denote the logarithmic frequency, b(x) the absolute-value characteristic and p(x) the phase characteristic in the Bode diagram (see FIGS. 6, 7). These functions are now firstly smoothed, that is to say the functions $\tilde{b}(x)$, and $\tilde{p}(x)$, are formed. The point $x_0$ where $$\tilde{p}(x_0) = -\phi_N$$

is now sought. $\phi_N$ is here a constant, for example $\phi_N=100$. The feature B is thus $$B = x_o$$

The feature A is obtained from the amplitude characteristic in accordance with $$A = \tilde{b}(x_0)$$

The normalized functions $$b_n(x_N) := b(x_N+x_0)-A = b(x_N+B)-A \quad (20)$$

and $$p_N(x_N):=p(x_N+x_0)=p(x_N+B) \quad (21)$$

are now formed.

Three further characteristic qunatities are calculated, specifically using $$f_c(x_N) = \frac{1}{90}\int_0^{x_N} p_N(\theta)\,d\theta - b_N(x_N) \quad (22)$$

$$C=f_c(0.16)-f_c(-0.84) \quad (23)$$

$$E=b_N(0) \quad (24)$$

$$F=p_N(0)+\phi_N \quad (25)$$

$$D = \log 10\left(\int_{0.0244}^{25} 10^{2B_N(\theta)}\,d\theta\right) - 2E \quad (26)$$

where $B_N(\theta):=b_N(\log 10(\theta))$

The feature G is calculated from the response signal y(t) by estimating the noise amplitude, that is to say using $$y(t)=y_g(t)+n(t)r$$

where $y_g$ is the smoothed response signal, n(t) is the noise with signal power 1, and r is the noise amplitude, it holds approximately that $$G=r.$$

It is assumed in this case that the input signal has the mean signal power 1. If the signal power of the input signal is not 1, G is divided by the root of the signal power.

The feature C permits systems of minimum phase and non-minimum phase to be distinguished. The feature D can also be denoted as the spectral energy of the impulse response. The feature G serves the purpose of determining more careful controller parameters in the case of a noisy response signal. The finally trained neural network, comprising three input neurons, 4 hidden neurons and three output neurons generates therefrom three output variables c, d and e, from which the desired controller parameters can be calculated in accordance with $$K_p 10^{c-A}$$

$$T_n=10^{d-B}$$

$$T_v=10^{e-B}.$$

Figure 3:
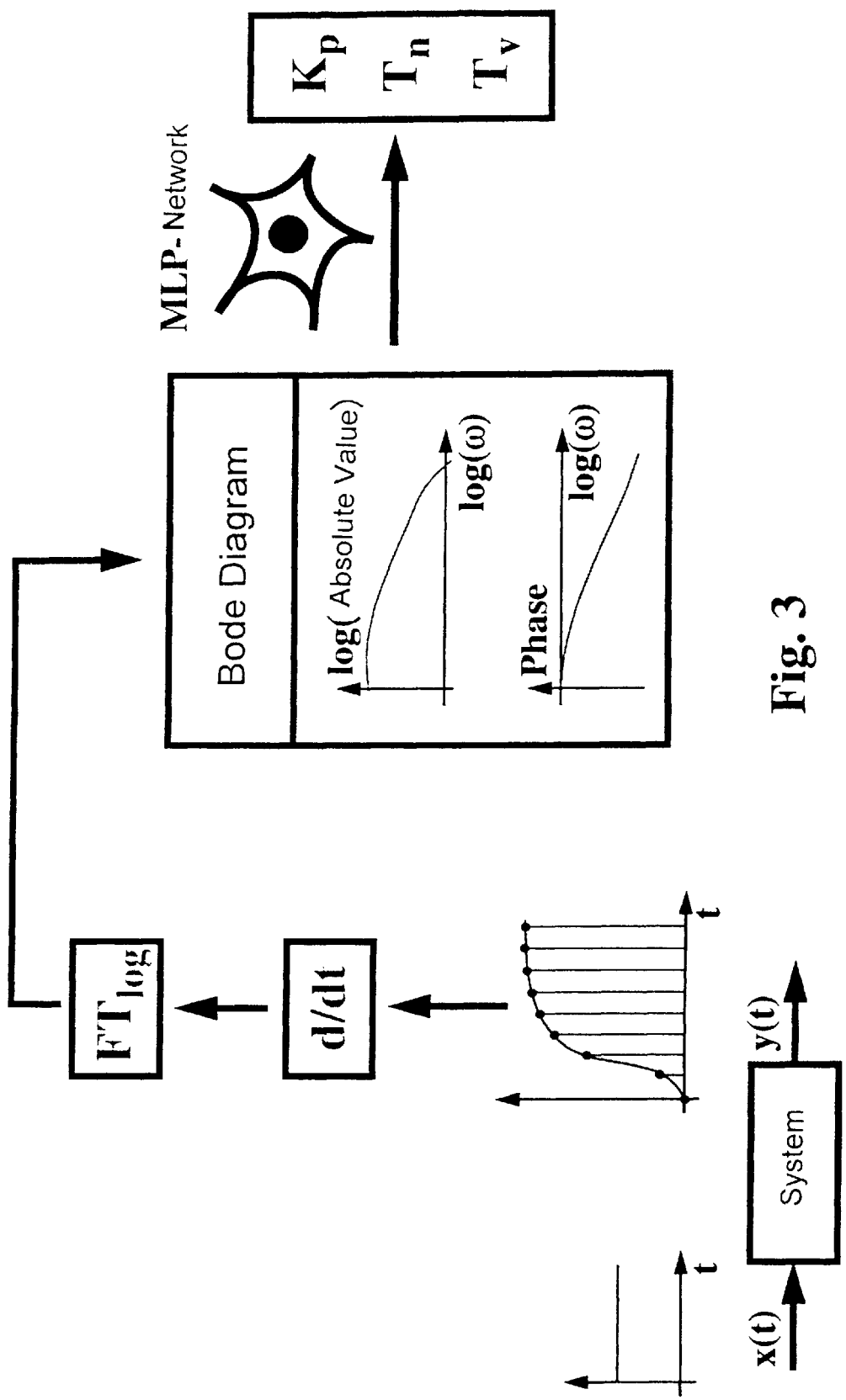
FIG. 3 is a schematic of the system with an open control loop.
Figure 4A:
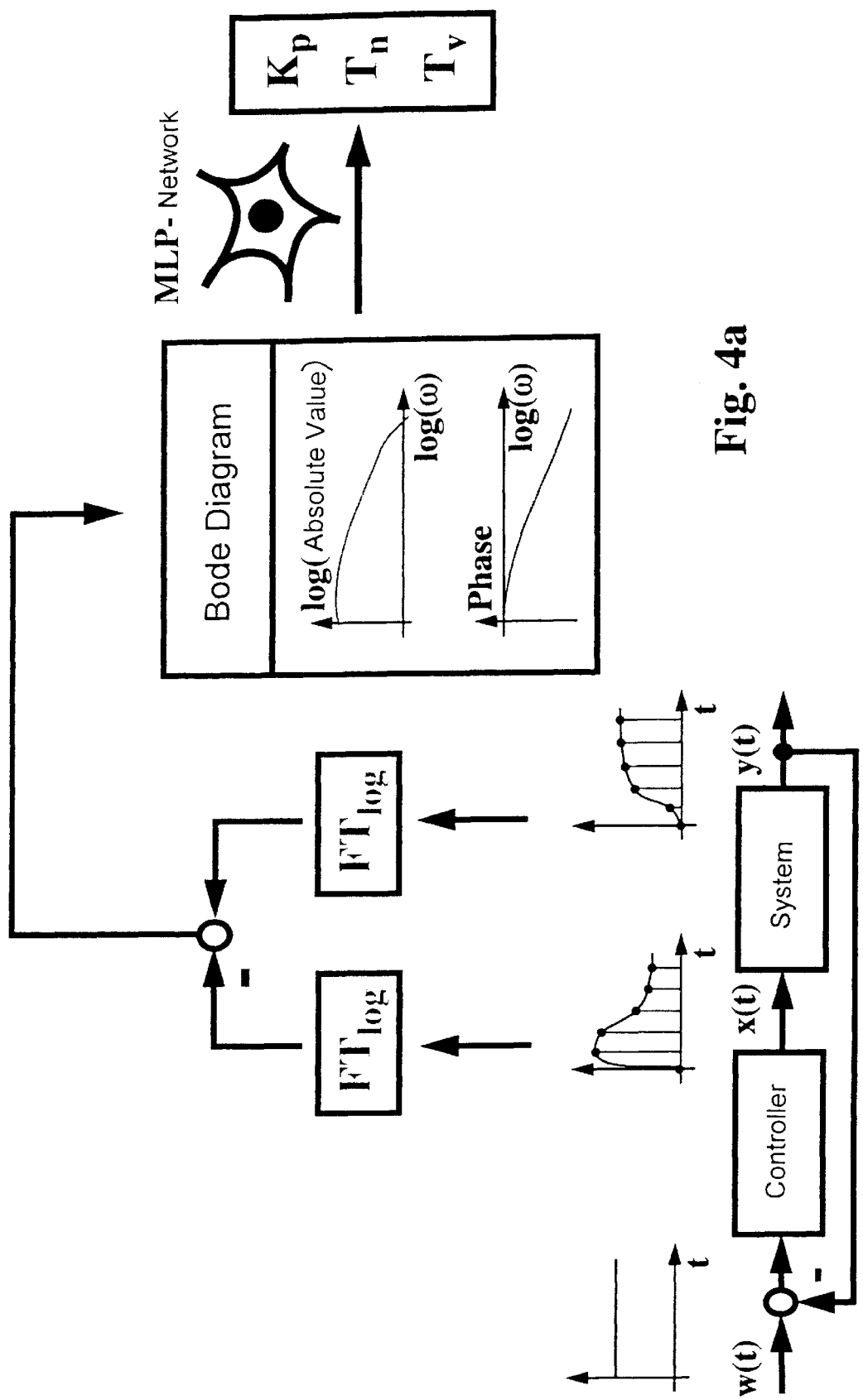
FIG. 4a is a schematic of the system with a closed control loop for the first method.

The steps for calculating the frequency characteristics will now be explained with the aid of FIGS. 3 and 4*a*, 4*b*: As FIG. 3 shows, to calculate the characteristics in the Bode diagram it is possible to start from a controlled system which can be fed a step signal (open control loop). It then suffices merely to measure the step response, since the step signal is known.

In the case of control loops, for example in process engineering, it is often impossible for the controlled system to be driven directly. It is then possible, for example, for the closed control loop to be fed the step signal in order then to be able to measure the input signal and the response signal of the controlled system to determine the frequency characteristics. An example of this is to be gathered in FIG. 4*a* and FIG. 4*b*. It may be seen from FIG. 4*a* that after transformation into the frequency domain, the difference between the frequency responses of the input signal and the response signal is formed and used to generate the characteristics. The explanations above relate to the first method.

Figure 4B:
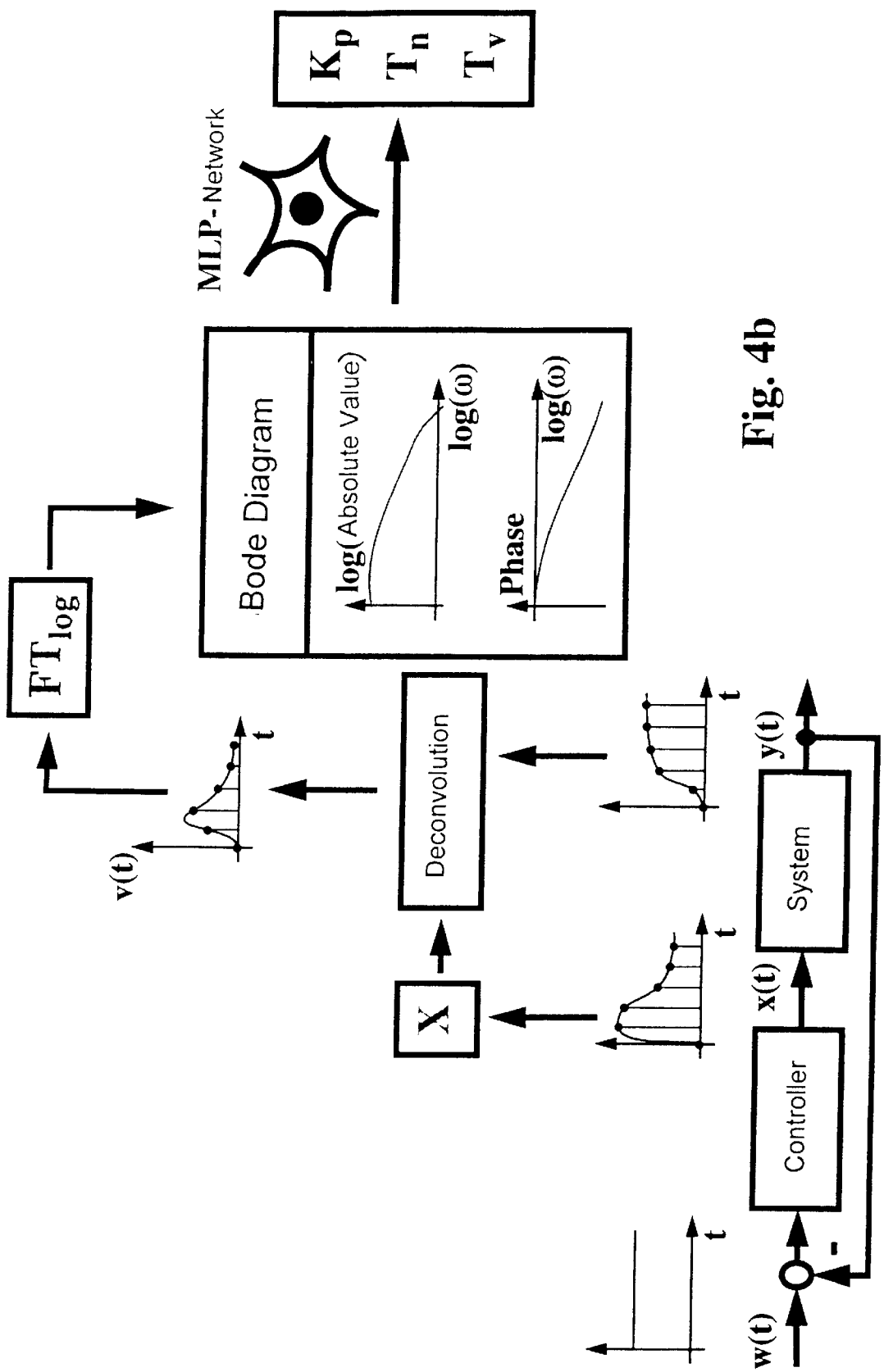
FIG. 4b is a schematic of the system with a closed control loop for the deconvolution method.

It may be seen from FIG. 4*b* that for the second method the impulse response is calculated by a deconvolution operation which depends on the input signal X(t). It is then not necessary to smooth the input and response signals. A smooth impulse response is emitted by the convolution method presented even in the case of a noisy measurement. The Bode diagram required is obtained therefrom by Fourier transformation using known methods as described by Unbehauen and Isermann.

I claim:

1. A method for generating control parameters from a response signal of a controlled system with a computer, the method which comprises:

sampling an input signal and a response signal for generating a sampled input signal and a sampled response signal;

smoothing the sampled input signal and the sampled response signal with the aid of a time-variant filter for generating a smoothed input signal and a smoothed response signal by smoothing at least one of the sampled input signal and the sampled response signal in accordance with the formula:

$$\tilde{x}=\underline{V}x$$

$$\underline{v}=\underline{V}y$$

where $\underline{y}$ denotes a vector consisting of samples of the response signal, $\underline{V}$ a matrix for smoothing, $\underline{v}$ a vector of a smoothed impulse response, $\underline{x}$ a vector of the input signal, and $\tilde{x}$ a vector of the smoothed input signal;

generating in each case frequency characteristics from the smoothed input signal and the smoothed response signal;

forming a difference between the frequency characteristics in a Bode diagram; and determining control parameters with the aid of the difference.

2. The method according to claim 1, which comprises:

differentiating the smoothed input signal and the smoothed response signal for generating a smoothed and differentiated input signal and a smoothed and differentiated response signal with the aid of the time-variant filter; and generating the frequency characteristics from the smoothed and differentiated input signal and the smoothed and differentiated response signal.

3. The method according to claim 1, which comprises normalizing the Bode diagram with respect to frequency.

4. The method according to claim 1, which comprises:

generating characteristics of the Bode diagram in accordance with a method of approximating one of a step response and an impulse response by one of a polygon and rectangular blocks; and transforming into a frequency domain with elementary correspondences.

5. The method according to claim 1, which comprises obtaining the matrix $\underline{V}$ for smoothing from an energy function having a term specifying a deviation of an approximation from a measured response signal, and having a term specifying a roughness of a reconstructed impulse response.

6. A method for generating control parameters from a response signal of a controlled system with a computer, which comprises:
sampling an input signal and a response signal for generating a sampled input signal and a sampled response signal;
smoothing the sampled input signal and the sampled response signal with the aid of a time-variant filter for generating a smoothed input signal and a smoothed response signal;
generating in each case frequency characteristics from the smoothed input signal and the smoothed response signal;
forming a difference between the frequency characteristics in a Bode diagram;
determining control parameters with the aid of the difference;
normalizing the Bode diagram with respect to a frequency at which a phase characteristic assumes a value $-\phi_N$.

7. A method for generating control parameters from a response signal of a controlled system with a computer, which comprises:
sampling an input signal and a response signal for generating a sampled input signal and a sampled response signal;
smoothing the sampled input signal and the sampled response signal with the aid of a time-variant filter for generating a smooth input signal and a smoothed response signal;
generating in each case frequency characteristics from the smoothed input signal and the smoothed response signal;
forming a difference between the frequency characteristics in a Bode diagram by approximating one of a step response and an impulse response by one of a polygon and rectangular blocks;
determining control parameters with the aid of the difference;
transforming into a frequency domain with elementary correspondences; and
approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where H(jω) denotes a frequency response, and h and T symbolize a height and a width of a rectangular block, respectively.

8. A method for generating control parameters from a response signal of a controlled system with a computer, which comprises:
sampling an input signal and a response signal for generating a sampled input signal and a sampled response signal;
smoothing the sampled input signal and the sampled response signal with the aid of a time-variant filter for generating a smoothed input signal and a smoothed response signal;
generating in each case frequency characteristics from the smoothed input signal and the smoothed response signal;
forming a difference between the frequency characteristics in a Bode diagram;
normalizing the Bode diagram to a frequency at which a phase characteristic assumes a value $-\phi_N$;
determining control parameters with the aid of the difference;
differentiating the smoothed input signal and the smoothed response signal for generating a smoothed and differentiated input signal and a smoothed and differentiated response signal with the aid of the time-variant filter; and
generating the frequency characteristics from the smoothed and differentiated input signal and the smoothed and differentiated response signal.

9. A method for generating control parameters from a response signal of a controlled system with a computer, which comprises:
sampling an input signal and a response signal for generating a sampled input signal and a sampled response signal;
smoothing the sampled input signal and the sampled response signal with the aid of a time-variant filter for generating a smoothed input signal and a smoothed response signal;
generating in each case frequency characteristics from the smoothed input signal and the smoothed response signal;
forming a difference between the frequency characteristics in a Bode diagram in accordance with a method of approximating one of a step response and an impulse response by one of a polygon and rectangular blocks which comprises approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where H(jω) denotes a frequency response, and h and T symbolize a height and a width of a rectangular block, respectively;
determining control parameters with the aid of the difference;
differentiating the smoothed input signal and the smoothed response signal for generating a smoothed and differentiated input signal and a smoothed and differentiated response signal with the aid of the time-variant filter;
generating the frequency characteristics from the smoothed and differentiated input signal and the smoothed and differentiated response signal; and
transforming into a frequency domain with elementary correspondences.

10. The method according to claim 5, wherein the matrix $\underline{V}$ for smoothing is:

$$\underline{V} = \underline{A}^3(\underline{A}^{4T}\underline{D}_0\underline{A}^4 + \underline{A}^{3T}\underline{D}_1\underline{A}^3 + \underline{A}^{2T}\underline{D}_2\underline{A}^2 + \underline{A}^T\underline{D}_3\underline{A} + \underline{D}_4)^{-1}\underline{A}^{4T}\underline{D}_0$$

where $\underline{D}_1 \ldots \underline{D}_4$ denote arbitrarily selectable diagonal matrices, $\underline{A}$ an integration matrix, and T a transposition.

11. The method according to claim 7, which comprises obtaining an approximation of the frequency response from the vector $\underline{v}$ with:

$$\underline{f} \cong \frac{1}{(q-1)T} H V \underline{y}$$

with $$\underline{H} = [\underline{h}_1 \underline{h}_2 \ldots \underline{h}_m]^T,$$

and $$[H(j\omega_1) H(j\omega_2) \ldots H(j\omega_m)] \cong \frac{1}{(q-1)T} \underline{v}^T [\underline{h}_1 \underline{h}_2 \ldots \underline{h}_m],$$

where $\underline{f}$ denotes an approximation of the frequency response, $\underline{H}$ a frequency transformation matrix, $\underline{V}$ a matrix for smoothing, and $\underline{y}$ a vector consisting of samples of the response signal.

12. The method according to claim 11, wherein the matrix $\underline{V}$ for smoothing and differentiating is:

$$\underline{V} = \underline{A}^3(\underline{A}^{4T}\underline{D}_0\underline{A}^4 + \underline{A}^{3T}\underline{D}_1\underline{A}^3 + \underline{A}^{2T}\underline{D}_2\underline{A}^2 + \underline{A}^T\underline{D}_3\underline{A} + \underline{D}_4)^{-1}\underline{A}^{4T}\underline{D}_0$$

where $\underline{D}_1 \ldots \underline{D}_4$ denote arbitrarily selectable diagonal matrices, $\underline{A}$ an integration matrix, and T a transposition.

13. The method according to claim 9, which comprises obtaining an approximation of the frequency response from the vector $\underline{y}$ with:

$$\underline{f} \cong \frac{1}{(q-1)T} H V \underline{y}$$

with $$\underline{H} = [\underline{h}_1 \underline{h}_2 \ldots \underline{h}_m]^T,$$

and $$[H(j\omega_1) H(j\omega_2) \ldots H(j\omega_m)] \cong \frac{1}{(q-1)T} \underline{v}^T [\underline{h}_1 \underline{h}_2 \ldots \underline{h}_m],$$

where $\underline{f}$ denotes an approximation of the frequency response, $\underline{H}$ a frequency transformation matrix, $\underline{V}$ a matrix for smoothing and differentiating, and $\underline{y}$ a vector consisting of samples of the response signal.

14. A method for generating control parameters from a response signal of a controlled system with a computer, which comprises:
   sampling an input signal and a response signal for generating a sampled input signal and a sampled response signal;
   deconvoluting the response signal with respect to the input signal for generating a smoothed impulse response from the sampled response signal in accordance with the formula:

$$\tilde{x} = \underline{V}\underline{x}$$

$$\underline{v} = \underline{V}\underline{y}$$

where $\underline{y}$ denotes a vector consisting of samples of the response signal, $\underline{V}$ a matrix for deconvolution, $\underline{v}$ a vector of a smoothed impulse response, $\underline{x}$ a vector of the input signal, and $\tilde{x}$ a vector of a smoothed input signal;
   forming frequency characteristics in a Bode diagram from the impulse response; and
   determining control parameters with the aid of the frequency characteristics.

15. The method according to claim 14, which comprises obtaining the matrix for deconvolution from an energy function which has a term which specifying the deviation of the approximation from a measured response signal, and having a term specifying a roughness of a reconstructed impulse response.

16. A method for generating control parameters from a response signal of a controlled system with a computer, which comprises:
   sampling an input signal and a response signal for generating a sampled input signal and a sampled response signal;
   deconvoluting the response signal with respect to the input signal for generating a smoothed impulse response from the sampled response signal;
   forming frequency characteristics in a Bode diagram from the impulse response;
   normalizing the Bode diagram to a frequency at which a phase characteristic assumes a value $-\phi_N$; and
   determining control parameters with the aid of the frequency characteristics.

17. The method according to claim 15, wherein the matrix $\underline{V}$ for deconvolution is obtained by minimizing the following energy function:

$$\epsilon(\underline{b}) = k((\underline{v} - \underline{X}\underline{A}^3\underline{b})^T$$

$$\underline{D}_0(\underline{v} - \underline{X}\underline{A}^3\underline{b}) + \underline{v}^T\underline{D}_1\underline{v} + \underline{a}^{T}\underline{D}_2\underline{a}$$

$$+\underline{r}^T\underline{D}_3\underline{r} + \underline{b}^T\underline{D}_4\underline{b})$$

where k denotes a constant, $\underline{X}$ a convolution integration matrix which is calculated as a function of the input signal x(t), $\underline{A}$ an integration matrix, $\underline{r} = \underline{A}\,\underline{b}$, $\underline{a} = \underline{A}\,\underline{r}$, $\underline{v} = \underline{A}\,\underline{a}$, and $\underline{D}_0, \underline{D}_1, \underline{D}_2, \ldots \underline{D}_4$ arbitrarily selectable diagonal matrices, and the solution of a minimization is $$\underline{v} = \underline{V}\underline{y}$$

$$\underline{V} = \underline{A}^3(\underline{A}^{3T}\underline{X}^T\underline{D}_0\underline{X}\underline{A}^3 + \underline{A}^{3T}\underline{D}_1\underline{A}^3 +$$

$$\underline{A}^{2T}\underline{D}_2\underline{A}^2 + \underline{A}^T\underline{D}_3\underline{A} + \underline{D}_4)^{-1}\underline{A}^{3T}\underline{X}^T\underline{D}_0.$$

18. A method for generating control parameters from a response signal of a controlled system with a computer, which comprises:
   sampling an input signal and a response signal for generating a sampled input signal and a sampled response signal;
   deconvoluting the response signal with respect to the input signal for generating a smoothed impulse response from the sampled response signal;
   forming frequency characteristics in a Bode diagram from the impulse response; and
   generating characteristics of the Bode diagram in accordance with a method of approximating one of a step response and an impulse response by one of a polygon and rectangular blocks;
   transforming into a frequency domain with elementary correspondences;
   determining control parameters with the aid of the frequency characteristics; and
   approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where $H(j\omega)$ denotes a frequency response, and h and T symbolize a height and a width of a rectangular block, respectively.

19. The method according to claim 17, wherein the constant k has a value of 0.5.

20. The method according to claim 18, which comprises obtaining an approximation of the frequency response from the vector $\underline{y}$ with:

$$\underline{f} \cong \frac{1}{(q-1)T}\underline{H}\,\underline{V}\,\underline{y}$$

with $$\underline{H}[\underline{h_1}\underline{h_2}\ldots\underline{h_m}]^T,$$

and $$[H(j\omega_1)H(j\omega_2)\ldots H(j\omega_m)] \cong \frac{1}{(q-1)T}\underline{v}^T[\underline{h_1}\underline{h_2}\ldots\underline{h_m}],$$

where $\underline{f}$ denotes an approximation of the frequency response, $\underline{H}$ a frequency transformation matrix, $\underline{V}$ a matrix for smoothing and differentiating, and $\underline{y}$ a vector consisting of samples of the response signal.

21. A method for generating control parameters from a response signal of a controlled system with a computer, the method which comprises:
   sampling a response signal for generating a sampled response signal;
   smoothing the sampled response signal with the aid of a time-variant filter for generating a smoothed response signal;
   generating frequency characteristics in a Bode diagram from the smoothed response signal;
   determining control parameters with the aid of the frequency characteristics.

22. The method according to claim 21, which comprises:
   differentiating the smoothed response signal for generating a smoothed and differentiated response signal with the aid of the time-variant filter; and
   generating the frequency characteristics from the smoothed and differentiated response signal.

23. The method according to claim 21, which comprises normalizing the Bode diagram with respect to frequency.

24. The method according to claim 21, which comprises:
   generating characteristics of the Bode diagram in accordance with a method of approximating one of a step response and an impulse response by one of a polygon and rectangular blocks; and
   transforming into a frequency domain with elementary correspondences.

25. The method according to claim 22, wherein the smoothing and the differentiating of the response signal are performed in accordance with the formula:

$$\tilde{x} = \underline{V}\underline{x}$$

$$\underline{v} = \underline{V}\underline{y}$$

where $\underline{y}$ denotes a vector consisting of samples of the response signal, $\underline{V}$ a matrix for smoothing and differentiating, $\underline{v}$ a vector a smoothed impulse response, $\underline{x}$ a vector of an input signal, and $\tilde{x}$ is a vector of a smoothed input signal.

26. The method according to claim 22, which comprises normalizing the Bode diagram with respect to frequency.

27. The method according to claim 22, which comprises:
   generating characteristics of the Bode diagram in accordance with a method of approximating one of a step response and an
   impulse response by one of a polygon and rectangular blocks; and
   transforming into a frequency domain with elementary correspondences.

28. The method according to claim 21, which comprises obtaining the matrix $\underline{V}$ for smoothing from an energy function having a term specifying a deviation of an approximation from a measured response signal, and having a term specifying a roughness of a reconstructed impulse response.

29. A method for generating control parameters from a response signal of a controlled system with a computer, which comprises:
   sampling a response signal for generating a sampled response signal;
   smoothing the sampled response signal with the aid of a time-variant filter for generating a smoothed response signal;
   generating frequency characteristics in a Bode diagram from the smoothed response signal;
   determining control parameters with the aid of the frequency characteristics; and
   normalizing the Bode diagram with respect to a frequency at which a phase characteristic assumes a value $-\phi_N$.

30. A method for generating control parameters from a response signal of a controlled system with a computer, which comprises:
   sampling a response signal for generating a sampled response signal;
   smoothing the sampled response signal with the aid of a time-variant filter for generating a smoothed response signal;
   generating frequency characteristics in a Bode diagram from the smoothed response signal;
   determining control parameters with the aid of the frequency characteristics;
   generating characteristics of the Bode diagram in accordance with a method of approximating one of a step response and an impulse response by one of a polygon and rectangular blocks; and
   transforming into a frequency domain with elementary correspondences; and
   approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where $H(j\omega)$ denotes a frequency response, and h and T symbolize a height and a width of a rectangular block, respectively.

31. The method according to claim 25, which comprises obtaining the matrix $\underline{V}$ for smoothing and differentiating from an energy function having a term specifying a deviation of an approximation from a measured response signal, and having a term specifying a roughness of a reconstructed impulse response.

32. The method according to claim 26, which comprises normalizing to a frequency at which a phase characteristic assumes a value $-\phi_N$.

33. The method according to claim 27, which comprises approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where $H(j\omega)$ denotes a frequency response, and h and T symbolize a height and a width of a rectangular block, respectively.

34. The method according to claim 28, which comprises obtaining the matrix for smoothing from the energy function $$\epsilon(\underline{a})=k[(\underline{v}-\underline{A}^2\underline{a})^T(\underline{v}-\underline{A}^2\underline{a})+\underline{a}^T\underline{D}\underline{a}]$$

the first term being the deviation of the approximation from the measured response signal, the second term being the roughness of the approximation, with $\underline{s}=\underline{A}\underline{v}$, $\underline{v}=\underline{A}\underline{a}$, and $\underline{s}=\underline{A}^2\underline{a}$, $\underline{D}$ being a diagonal matrix, $\underline{A}$ an integration matrix, k a constant, $\underline{y}$ a vector consisting of samples of the response signal, and T indicating a transposition.

35. The method according to claim 28, which comprises obtaining the matrix for smoothing from the energy function $$\epsilon(\underline{b})=k[(\underline{v}-\underline{A}^4\underline{b})^T\underline{D}_0(\underline{v}-\underline{A}^4\underline{b})+$$

$$\underline{v}^T\underline{D}_1\underline{v}+\underline{a}^T\underline{D}_2\underline{a}+\underline{r}^T\underline{D}_3\underline{r}+\underline{b}^T\underline{D}_4\underline{b}]$$

where $\underline{D}_1 \ldots \underline{D}_4$ are diagonal matrices, $\underline{A}$ is an integration matrix, $\underline{s}=\underline{A}\ \underline{v}$, $\underline{v}=\underline{A}\ \underline{a}$, $\underline{a}=\underline{A}\ \underline{r}$, $\underline{r}=\underline{A}\ \underline{b}$, k is a constant, $\underline{y}$ a vector consisting of samples of the response signal, and T indicates a transposition.

36. The method according to claim 30, which comprises obtaining an approximation of the frequency response from the vector $\underline{y}$ with:

$$\underline{f} \cong \frac{1}{(q-1)T}\underline{H}\underline{V}\underline{y}$$

with $$\underline{H}=[\underline{h}_1\underline{h}_2 \ldots \underline{h}_m]^T,$$

and $$[H(j\omega_1)H(j\omega_2)\ldots H(j\omega_m)] \cong \frac{1}{(q-1)T}\underline{v}^T[\underline{h}_1\underline{h}_2\ldots\underline{h}_m],$$

where $\underline{f}$ denotes an approximation of the frequency response, $\underline{H}$ a frequency transformation matrix, $\underline{V}$ a matrix for smoothing, and $\underline{y}$ a vector consisting of samples of the response signal.

37. A method for generating control parameters from a response signal of a controlled system with a computer, which comprises:

sampling a response signal for generating a sampled response signal;

smoothing the sampled response signal with the aid of a time-variant filter for generating a smoothed response signalin accordance with the formula:

$$\tilde{x}=\underline{V}\underline{x}$$

$$\underline{v}=\underline{V}\underline{y}$$

where $\underline{y}$ denotes a vector consisting of samples of the response signal, $\underline{V}$ a matrix for smoothing and differentiating, $\underline{v}$ a vector a smoothed impulse response, $\underline{x}$ a vector of an input signal, and $\tilde{x}$ is a vector of a smoothed input signal;

generating frequency characteristics in a Bode diagram from the smoothed response signal;

determining control parameters with the aid of the frequency characteristics;

differentiating the smoothed response signal for generating a smoothed and differentiated response signal with the aid of the time-variant filter;

generating the frequency characteristics from the smoothed and differentiated response signal;

obtaining the matrix for smoothing and differentiating from the energy function $$\epsilon(\underline{a})=k[(\underline{v}-\underline{A}^2\underline{a})^T(\underline{v}-\underline{A}^2\underline{a})+\underline{a}^T\underline{D}\underline{a}]$$

the first term being the deviation of the approximation from the measured response signal, the second term being the roughness of the approximation, with $\underline{s}=\underline{A}\underline{v}$, $\underline{v}=\underline{A}\underline{a}$, and $\underline{s}=\underline{A}^2\underline{a}$, $\underline{D}$ being a diagonal matrix, $\underline{A}$ an integration matrix, k being a constant, $\underline{y}$ a vector consisting of samples of the response signal, and T indicating a transposition.

38. A method for generating control parameters from a response signal of a controlled system with a computer, which comprises:

sampling a response signal for generating a sampled response signal;

smoothing the sampled response signal with the aid of a time-variant filter for generating a smoothed response signal in accordance with the formula:

$$\tilde{x}=\underline{V}\underline{x}$$

$$\underline{v}=\underline{V}\underline{y}$$

where $\underline{y}$ denotes a vector consisting of samples of the response signal, $\underline{V}$ a matrix for smoothing and differentiating, $\underline{v}$ a vector a smoothed impulse response, $\underline{x}$ a vector of an input signal, and $\tilde{x}$ is a vector of a smoothed input signal;

generating frequency characteristics in a Bode diagram from the smoothed response signal;

determining control parameters with the aid of the frequency characteristics;

differentiating the smoothed response signal for generating a smoothed and differentiated response signal with the aid of the time-variant filter;

generating the frequency characteristics from the smoothed and differentiated response signal;

obtaining the matrix for smoothing and differentiating from the energy function $$\epsilon(\underline{b})=k[(\underline{v}-\underline{A}^4\underline{b})^T\underline{D}_0(\underline{v}-\underline{A}^4$$

$$\underline{b})+\underline{v}^T\underline{D}_1\underline{v}+\underline{a}^T\underline{D}_2\underline{a}+\underline{r}^T\underline{D}_3\underline{r}+\underline{b}^T\underline{D}_4\underline{b}]$$

where $\underline{D}_1 \ldots D_4$ are diagonal matrices, $\underline{A}$ is an integration matrix, $\underline{s}=\underline{A}\,\underline{v}$, $\underline{v}=\underline{A}\,\underline{a}$, $\underline{a}=\underline{A}\,\underline{r}$, $\underline{r}=\underline{A}\,\underline{b}$, k is a constant, $\underline{y}$ a vector consisting of samples of the response signal, and T indicates a transposition.

39. A method for generating control parameters from a response signal of a controlled system with a computer, which comprises:

sampling a response signal for generating a sampled response signal;

smoothing the sampled response signal with the aid of a time-variant filter for generating a smoothed response signal;

generating frequency characteristics in a Bode diagram from the smoothed response signal;

determining control parameters with the aid of the frequency characteristics;

differentiating the smoothed response signal for generating a smoothed and differentiated response signal with the aid of the time-variant filter;

generating the frequency characteristics from the smoothed and differentiated response signal;

generating characteristics of the Bode diagram in accordance with a method of approximating one of a step response and an impulse response by one of a polygon and rectangular blocks;

transforming into a frequency domain with elementary correspondences;

approximating a frequency response with the aid of a relation:

$$H(j\omega) \cong \sum_{v=1}^{q} h[v-1] H_v(j\omega) \cong \frac{1}{(q-1)T} \sum_{v=1}^{q} v_v H_v(j\omega)$$

where $H(j\omega)$ denotes a frequency response, and h and T symbolize a height and a width of a rectangular block, respectively; and obtaining an approximation of the frequency response from the vector $\underline{y}$ with:

$$\underline{f} \cong \frac{1}{(q-1)T} \underline{HV}_{\underline{y}}$$

with $$\underline{H}=[\underline{h}_1 \underline{h}_2 \ldots \underline{h}_m]^T,$$

and $$[H(j\omega_1)H(j\omega_2) \ldots H(j\omega_m)] \cong$$

$$[H(j\omega_1)H(j\omega_2) \cdots H(j\omega_m)] \cong \frac{1}{(q-1)T} \underline{v}^T [\underline{h}_1 \underline{h}_2 \cdots \underline{h}_m],$$

$$\underline{v}^T[\underline{h}_1 \underline{h}_2 \ldots \underline{h}_m],$$

where $\underline{f}$ denotes an approximation of the frequency response, $\underline{H}$ a frequency transformation matrix, $\underline{V}$ a matrix for smoothing and differentiating, and $\underline{y}$ a vector consisting of samples of the response signal.

40. The method according to claim 34, wherein the constant k has a value of 0.5.

41. The method according to claim 37, wherein the constant k has a value of 0.5.

42. A system for adaptive setting of a PID controller with the aid of a neural network, comprising:

a sampling device for sampling a response signal, the response signal emitted by a controlled system in response to a supplied input signal;

a transformation device for smoothing the input signal and the response signal and transforming the input signal and the response signal into a frequency domain, said transformation device performing the smoothing of the input signal and the response signal in accordance with the formula:

$$\tilde{x}=\underline{V}\underline{x}$$

$$\tilde{y}=\underline{V}\underline{y}$$

where $\underline{y}$ denotes a vector consisting of samples of the response signal, $\underline{V}$ a matrix for smoothing, $\underline{v}$ a vector of a smoothed impulse response, $\underline{x}$ a vector of the input signal, and $\tilde{x}$ a vector of the smoothed input signal;

a diagram device for forming a difference between frequency characteristics of the input signal and the response signal in a Bode diagram and for generating a Bode diagram of the controlled system; and a neural network for emitting parameters for setting a PID controller, an absolute value characteristic of the Bode diagram and a phase characteristic of the Bode diagram being supplied to said neural network as input values.

43. The system according to claim 42, wherein said transformation device additionally differentiates the input signal and the response signal.

44. The system according to claim 42, wherein said neural network is supplied with the absolute value characteristic of the Bode diagram and the phase characteristic of the Bode diagram after a conversion thereof.

45. The system according to claim 42, including a normalization device for normalizing the Bode diagram with respect to frequency.

46. The system according to claim 42, wherein said diagram device generates the characteristics of the Bode diagram in accordance with a method of approximating one of a step response and an impulse response by one of a polygon and rectangular blocks, and performs a transformation into the frequency domain with elementary correspondences.

47. A system for adaptive setting of a PID controller with the aid of a neural network, comprising:

a sampling device for sampling a response signal, the response signal emitted by a controlled system in response to a supplied input signal;

a transformation device for smoothing the input signal and the response signal and transforming the input signal and the response signal into a frequency domain;

a diagram device for forming a difference between frequency characteristics of the input signal and the response signal in a Bode diagram and for generating a Bode diagram of the controlled system;

a neural network for emitting parameters for setting a PID controller, an absolute value characteristic of the Bode diagram and a phase characteristic of the Bode diagram being supplied to said neural network as input values;

a normalization device for normalizing the Bode diagram with respect to frequency, said normalization unit performing a normalization to a frequency at which the phase characteristic assumes a value $-\phi_N$.

48. The system according to claim 42, wherein said transformation device obtains the matrix $\underline{V}$ for smoothing from an energy function having a term specifying a deviation of an approximation from a measured response signal, and having a term specifying a roughness of a reconstructed impulse response.

49. A system for adaptive setting of a PID controller with the aid of a neural network, comprising:

a sampling device for sampling a response signal, the response signal emitted by a controlled system in response to a supplied input signal;

a transformation device for smoothing the input signal and the response signal and transforming the input signal and the response signal into a frequency domain;

a diagram device for forming a difference between frequency characteristics of the input signal and the response signal in a Bode diagram and for generating a Bode diagram of the controlled system; and a neural network for emitting parameters for setting a PID controller, an absolute value characteristic of the Bode diagram and a phase characteristic of the Bode diagram being supplied to said neural network as input values;

said diagram device generating the characteristics of the Bode diagram in accordance with a method of approximating one of a step response and an impulse response by one of a polygon and rectangular blocks, and performs a transformation into the frequency domain with elementary correspondences and said diagram device approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where $H(j\omega)$ denotes a frequency response, and h and T symbolize a height and a width of a rectangular block, respectively.

50. The system according to claim 48, wherein said transformation device uses the matrix $\underline{V}$ for smoothing:

$$\underline{V} = \underline{A}^3(\underline{A}^{4T}\underline{D}_0\underline{A}^4 + \underline{A}^{3T}\underline{D}_1\underline{A}^3 + \underline{A}^{2T}\underline{D}_2\underline{A}^2 + \underline{A}^T\underline{D}_3\underline{A} + \underline{D}_4)^{-1}\underline{A}^{4T}\underline{D}_0$$

where $\underline{D}_1 \ldots \underline{D}_4$ denote arbitrarily selectable diagonal matrices, $\underline{A}$ an integration matrix, and T a transposition.

51. The system according to claim 49, wherein said diagram device obtains an approximation of the frequency response from a vector $\underline{y}$ with:

$$\underline{f} \cong \frac{1}{(q-1)T}\underline{H}\underline{V}\underline{y}$$

with $$\underline{H} = [\underline{h}_1 \underline{h}_2 \ldots \underline{h}_m]^T,$$

and $$[H(j\omega_1)H(j\omega_2)\ldots H(j\omega_m)] \cong \frac{1}{(q-1)T}\underline{v}^T[\underline{h}_1\underline{h}_2\ldots\underline{h}_m],$$

where $\underline{f}$ denotes an approximation of the frequency response, $\underline{H}$ a frequency transformation matrix, $\underline{V}$ a matrix for smoothing, and $\underline{y}$ a vector consisting of samples of the response signal.

52. A system for adaptive setting of a PID controller with the aid of a neural network, comprising:

a sampling device for sampling a response signal, the response signal emitted by a controlled system in response to a supplied input signal;

a deconvolution device for calculating a smoothed impulse response from the response signal as a function of the input signal, said deconvolution device performing the smoothing of the response signal in accordance with the formula:

$$\tilde{x} = \underline{V}x$$

$$\underline{v} = \underline{V}\underline{v}$$

where $\underline{y}$ denotes a vector consisting of samples of the response signal, $\underline{V}$ a matrix for deconvoluting, $\underline{v}$ a vector of a smoothed impulse response, $\underline{x}$ a vector of the input signal, and $\tilde{x}$ a vector of a smoothed input signal;

a diagram device for obtaining a Bode diagram of the controlled system from the smoothed impulse response; and a neural network for emitting parameters for setting a PID controller, an absolute value characteristic of the Bode diagram and a phase characteristic of the Bode diagram being supplied to said neural network as input values.

53. The system according to claim 52, wherein said neural network is supplied with the absolute value characteristic of the Bode diagram and the phase characteristic of the Bode diagram after a conversion thereof.

54. The system according to claim 52, which comprises a normalization device for normalizing the Bode diagram with respect to the frequency.

55. The system according to claim 52, wherein said diagram device generates the characteristics of the Bode diagram in accordance with a method of approximating one of a step response and an impulse response by one of a polygon and rectangular blocks, and performs a transformation into the frequency domain with elementary correspondences.

56. A system for adaptive setting of a PID controller with the aid of a neural network, comprising:

a sampling device for sampling a response signal, the response signal emitted by a controlled system in response to a supplied input signal;

a deconvolution device for calculating a smoothed impulse response from the response signal as a function of the input signal;

a diagram device for obtaining a Bode diagram of the controlled system from the smoothed impulse response;

a neural network for emitting parameters for setting a PID controller, an absolute value characteristic of the Bode diagram and a phase characteristic of the Bode diagram being supplied to said neural network as input values;

a normalization device for normalizing the Bode diagram with respect to the frequency, said normalization device performing a normalization to a frequency at which the phase characteristic assumes a value $-\phi_N$.

57. The system according to claim 52, wherein said transformation device obtains the matrix $\underline{V}$ for deconvoluting from an energy function having a term specifying a deviation of an approximation from a measured response signal, and having a term specifying a roughness of a reconstructed impulse response.

58. A system for adaptive setting of a PID controller with the aid of a neural network, comprising:
- a sampling device for sampling a response signal, the response signal emitted by a controlled system in response to a supplied input signal;
- a deconvolution device for calculating a smoothed impulse response from the response signal as a function of the input signal;
- a diagram device for obtaining a Bode diagram of the controlled system from the smoothed impulse response, said diagram device generating the characteristics of the Bode diagram in accordance with a method of approximating one of a step response and an impulse response by one of a polygon and rectangular blocks, and performs a transformation into the frequency domain with elementary correspondences and approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where $H(j\omega)$ denotes a frequency response, and h and T symbolize a height and a width of a rectangular block, respectively; and
- a neural network for emitting parameters for setting a PID controller, an absolute value characteristic of the Bode diagram and a phase characteristic of the Bode diagram being supplied to said neural network as input values.

59. The system according to claim 57, wherein said transformation device obtains the matrix $\underline{V}$ for deconvoluting by minimizing the following energy function:

$$\epsilon(\underline{b})=k((\underline{v}-\underline{XA}^3\underline{b})^T\underline{D}_0(\underline{v}-\underline{XA}^3\underline{b})+\underline{v}^T\underline{D}_1+\underline{a}^T$$

$$\underline{D}_2\underline{a}+\underline{r}^T\underline{D}_3\underline{r}+\underline{b}^T\underline{D}_4\underline{b})$$

where k denotes a constant, $\underline{X}$ a convolution integration matrix which is calculated as a function of the input signal x(t), $\underline{A}$ an integration matrix, $\underline{r}=\underline{A}\,\underline{b}$, $\underline{a}=\underline{A}\,\underline{r}$, $\underline{v}=\underline{A}\,\underline{a}$, and $\underline{D}_0$, $\underline{D}_1$, $\underline{D}_2$, ... $\underline{D}_4$ arbitrarily selectable diagonal matrices, and the solution of a minimization is $$\underline{v}=\underline{V}\underline{y}$$

$$\underline{V}=\underline{A}^3(\underline{A}^{3T}\underline{X}^T\underline{D}_0\underline{XA}^3+\underline{A}^{3T}\underline{D}_1\underline{A}^3\underline{A}^{2T}$$

$$\underline{D}_2\underline{A}^2+\underline{A}^T\underline{D}_3\underline{A}+\underline{D}_4)^{-1}\underline{A}^{3T}\underline{X}^T\underline{D}_0.$$

60. The system according to claim 58, wherein said diagram device obtains an approximation of a frequency response from a vector $\underline{y}$ with:

$$\underline{f} \cong \frac{1}{(q-1)T}\underline{H}\underline{V}\underline{y}$$

with $$\underline{H}=[\underline{h}_1\underline{h}_2 \ldots \underline{h}_m]^T,$$

and $$[H(j\omega_1)H(j\omega_2)\ldots H(j\omega_m)] \cong \frac{1}{(q-1)T}\underline{v}^T[\underline{h}_1\underline{h}_2\ldots\underline{h}_m],$$

where $\underline{f}$ denotes an approximation of the frequency response, $\underline{H}$ a frequency transformation matrix, $\underline{V}$ a matrix for at least one of smoothing and deconvoluting, and $\underline{y}$ a vector consisting of samples of the response signal.

61. A system for adaptive setting of a PID controller with the aid of a neural network, comprising:
- a sampling device for sampling a response signal, the response signal emitted by a controlled system in response to a supplied input signal;
- a transformation device for smoothing the response signal and transforming the response signal into a frequency domain, said transformation device performs the smoothing of the response signal in accordance with the formula:

$$\tilde{x}=\underline{V}\underline{x}$$

$$\underline{v}=\underline{V}\underline{y}$$

where $\underline{y}$ denotes a vector consisting of samples of the response signal, $\underline{V}$ a matrix for at least one of smoothing and differentiating, $\underline{v}$ a vector of a smoothed impulse response, $\underline{x}$ a vector of the input signal, and $\tilde{x}$ a vector of a smoothed input signal;
- a diagram device for generating a Bode diagram from a smoothed response signal;
- a neural network for emitting parameters for setting a PID controller, an absolute value characteristic of the Bode diagram and a phase characteristic of the Bode diagram being supplied to said neural network as input values.

62. The system according to claim 61, wherein said transformation device additionally differentiates the response signal.

63. The system according to claim 61, wherein said neural network is supplied with the absolute value characteristic of the Bode diagram and the phase characteristic of the Bode diagram after a conversion thereof.

64. The system according to claim 61, including a normalization device for normalizing the Bode diagram with respect to frequency.

65. The system according to claim 61, wherein said diagram device generates the characteristics of the Bode diagram in accordance with a method of approximating one of a step response and an impulse response by one of a polygon and rectangular blocks, and performs the transformation into a frequency domain with elementary correspondences.

66. The system according to claim 61, wherein said transformation device obtains the matrix $\underline{V}$ for at least one of smoothing and differentiating from an energy function having a term specifying a deviation of an approximation from a measured response signal, and having a term specifying a roughness of a reconstructed impulse response.

67. A system for adaptive setting of a PID controller with the aid of a neural network, comprising:
- a sampling device for sampling a response signal, the response signal emitted by a controlled system in response to a supplied input signal;
- a transformation device for smoothing the response signal and transforming the response signal into a frequency domain;
- a diagram device for generating a Bode diagram from a smoothed response signal and generating the characteristics of the Bode diagram in accordance with a method of approximating one of a step response and an impulse response by one of a polygon and rectangular blocks, and performs the transformation into a frequency domain with elementary correspondences, and approximating a frequency response with the aid of a relation:

$$H(j\omega) \cong \sum_{v=1}^{q} h[v-1]H_v(j\omega) \cong \frac{1}{(q-1)T}\sum_{v=1}^{q} v_v H_v(j\omega)$$

where $H(j\omega)$ denotes a frequency response, and h and T symbolize a height and a width of a rectangular block, respectively; and a neural network for emitting parameters for setting a PID controller, an absolute value characteristic of the Bode diagram and a phase characteristic of the Bode diagram being supplied to said neural network as input values.

68. The system according to claim 67, wherein said diagram device obtains an approximation of the frequency response from a vector $\underline{y}$ with:

$$\underline{f} \cong \frac{1}{(q-1)T}\underline{H}\underline{V}\underline{y}$$

with $$\underline{H} = [\underline{h}_1 \underline{h}_2 \ldots \underline{h}_m]^T,$$

and $$[H(j\omega_1)H(j\omega_2)\ldots H(j\omega_m)] \cong \frac{1}{(q-1)T}\underline{v}^T[h_1 h_2 \ldots h_m],$$

where $\underline{f}$ denotes an approximation of the frequency response, $\underline{H}$ a frequency transformation matrix, $\underline{V}$ a matrix for at least one of smoothing and differentiating, and $\underline{y}$ a vector consisting of samples of the response signal.

\* \* \* \* \*

UNITED STATES PATENT AND TRADEMARK OFFICE
CERTIFICATE OF CORRECTION

PATENT NO.    : 6,353,766 B1
DATED         : March 5, 2002
INVENTOR(S)   : Klaus Weinzierl It is certified that error appears in the above-identified patent and that said Letters Patent is hereby corrected as shown below:

<u>Title page,</u>
Item [30], should read as follows:

-- February 9, 1996    (DE) ……….. 196 04 793 --

Signed and Sealed this

Twentieth Day of August, 2002

Attest:

JAMES E. ROGAN
*Attesting Officer*    *Director of the United States Patent and Trademark Office*